US006562883B2

(12) United States Patent
Goerl et al.

(10) Patent No.: US 6,562,883 B2
(45) Date of Patent: May 13, 2003

(54) PROCESS FOR PREPARING CARBON-BLACK-FILLED RUBBER POWDERS BASED ON AQUEOUS POLYMER-LATEX EMULSIONS

(75) Inventors: Udo Goerl, Recklinghausen (DE); Reinhard Stober, Hasselroth (DE); Matthias Schmitt, Neckargemuend (DE)

(73) Assignee: PKU Pulverkautschuk Union GmbH, Marl (DE)

( * ) Notice: Subject to any disclaimer, the term of this patent is extended or adjusted under 35 U.S.C. 154(b) by 0 days.

(21) Appl. No.: 09/791,622

(22) Filed: Feb. 26, 2001

(65) Prior Publication Data

US 2002/0026004 A1 Feb. 28, 2002

(30) Foreign Application Priority Data

Feb. 25, 2000 (DE) .......................... 100 08 877

(51) Int. Cl.$^7$ ................................. C08K 9/00
(52) U.S. Cl. ................. 523/215; 523/200; 523/204; 523/210; 523/201; 524/495; 524/432; 524/422; 524/492
(58) Field of Search ............... 524/495, 402, 524/422; 525/332.6, 331.9

(56) References Cited

U.S. PATENT DOCUMENTS

| 4,032,501 A | * | 6/1977 | Schulz ............... 260/33.6 |
| 4,757,101 A | * | 7/1988 | Kleinert et al. ........... 523/220 |
| 4,771,092 A | * | 9/1988 | Ollenik et al. ............ 524/99 |
| 4,835,196 A | * | 5/1989 | Mueller et al. ........... 523/334 |
| 6,329,449 B1 | * | 12/2001 | Gorl et al. .............. 523/343 |
| 6,340,724 B1 | * | 1/2002 | Gorl et al. .............. 529/442 |
| 6,348,522 B1 | * | 2/2002 | Smigerski et al. ........ 523/340 |

FOREIGN PATENT DOCUMENTS

| EP | 1 095 961 A2 | * | 10/2000 | ............ C08J/3/21 |
| EP | 1 127 911 A1 | * | 1/2001 | ............ C08J/3/215 |

* cited by examiner

*Primary Examiner*—David W. Wu
*Assistant Examiner*—Rip A. Lee
(74) *Attorney, Agent, or Firm*—Oblon, Spivak, McClelland, Maier & Neustadt, P.C.

(57) ABSTRACT

Fine-particle, filled rubber powders prepared by precipitation from aqueous mixtures of a filler suspension and a rubber-latex emulsion in the absence of water-soluble salts of metals of groups IIa, IIb, IIIa, or VIII of the Periodic Table of the Elements and in the absence of alkali metal silicate are used for vulcanizable rubber mixtures.

32 Claims, No Drawings

PROCESS FOR PREPARING CARBON-BLACK-FILLED RUBBER POWDERS BASED ON AQUEOUS POLYMER-LATEX EMULSIONS

BACKGROUND OF THE INVENTION

1. Field of the Invention

The invention relates to a process for preparing fine-particle rubber powders from rubber-latex emulsions by precipitation from an aqueous mixture having a filler. Further, the invention relates to the resulting powders.

2. Discussion of the Background

A wide variety of publications has dealt with the purpose and reasons for the use of rubber powders, and also with processes for the preparation of rubber powders.

The interest in pulverulent rubber/filler masterbatches can be explained as a necessary result of the processing technology used in the rubber industry, where rubber mixtures are prepared with high costs for energy, time and personnel. A main reason for this is that the rubber raw material is in bale form and its processing requires incorporation and dispersion of large amounts of active fillers (industrial carbon blacks, silicas, etc.) into the rubber phase.

This mechanical kneading process generally takes place industrially in large internal mixers or on roll mills, generally in two or more stages. The mixture is placed in intermediate storage between the individual mixing stages, and finally, after addition of the crosslinking chemicals the ready-to-use raw mixture is further processed in extruder systems or on calenders to give semifinished products (e.g. tire treads).

Only a completely new process technology can overcome this complicated method of rubber processing.

Rubber powder technology has long been regarded as the most suitable candidate. [Delphi Report "Künftige Herstellverfahren in der Gummiindustrie" [Production processes for the future in the rubber industry] Rubber Journal, Vol. 154, No. 11, 20–34 (1942)]. This technology combines the need for incorporating a filler at an early stage of the process with presentation of the material specifically in the form of a free-flowing rubber powder suitable for use in continuous mixing processes which have been state of the art for many years in the plastics industry.

The rubber powder is prepared as in the prior art by precipitation from a mixture of a filler suspension (e.g. carbon black or silica) and a rubber-latex emulsion, by lowering the pH with the aid of appropriate Brönsted or Lewis acids (DE-C 37 23 213, DE-C 37 23 214 and DE-C 28 22 148).

All of these patents regard it as essential to add water-soluble salts of a metal of Groups IIa, IIb, IIIa or VIII of the Periodic Table of the Elements, in amounts of from 0.5 to 6.5 phr. In more recent patents, DE 198 15 453.4 and DE 198 16 972.8, the addition of 10 phr of water-soluble salts of a metal of groups IIa, IIb, IIIa or VIII to the filler suspension is described.

This Group classification corresponds to the IUPAC recommendation (see Periodisches System der Elemente [Periodic Table of the Elements], Verlag Chemie, Weinheim, 1985). Typical examples for water-soluble salts of the above metals are magnesium chloride, zinc sulfate, aluminum chloride, aluminum sulfate, iron chloride, iron sulfate, cobalt nitrate and nickel sulfate. Aluminum salts are preferably used and more preferably aluminum sulfate.

The presence of an alkali metal silicate in amounts of up to 5 phr is also indispensable according to the prior art.

However, all of these non rubber-specific substances that are added in large amounts during preparation of the rubber powder have to be regarded as unnecessary and in some cases even as injurious constituents of the product. These non rubber-specific substances are partially incorporated into the product and a large part remains in the precipitation water. Thus, they are potential environmental pollutants. Complicated treatment of the wastewater is needed in some instances. The aim is therefore to prepare rubber/filler masterbatches by using, as far as possible, only substances which are desirable in rubber technology and/or improve vulcanizate performance, or which at least have no adverse effect (Cabot patent, PCT/US98/20279).

SUMMARY OF THE INVENTION

The object of the present invention is to develop a precipitation and preparation process for a fine-particle, pulverulent, filled rubber which is free from the undesirable ancillary constituents mentioned above and at the same time fulfills the other requirements placed upon the rubber powder, such as control of tack, and excellent vulcanizate properties.

This and other objects have been achieved according to the invention, the first embodiment of which includes a process for preparing a fine-particle, pulverulent, filled rubber, comprising:

precipitating said fine-particle, pulverulent, filled rubber from an aqueous mixture of a filler suspension and a rubber-latex emulsion in the absence of a water-soluble salt of a metal of Groups IIa, IIb, IIIa or VIII of the Periodic Table of the Elements, and in the absence of an alkali metal silicate.

DETAILED DESCRIPTION OF THE INVENTION

The invention describes a novel process for preparing pulverulent, free-flowing rubber/filler masterbatches. The process is characterized by the following procedure.

At the start of preparation of the novel rubber powders, the entirety of the filler is divided into three portions: core black, splitting black 1 and splitting black 2. The core black, which makes up from about 30 to 60% of the entirety of the carbon black in the final product, is dispersed in water. The total amount of water depends on the nature of the filler and on its degree of disaggregation. The amount of water-insoluble constituents in the filler is generally from 1 to 10%, preferably from 4 to 7%. The amount of water-insoluble constituents includes all values and subvalues therebetween, especially including 2, 3, 4, 5, 6, 7, 8 and 9%. The filler content of the suspension acts in the absence of the abovementioned bivalent salts as a regulator for the particle size distribution that is desired in the final product. Generally, higher solids content in the suspension gives a coarser product, and lower solids content yields a finer product.

Two different precipitation procedures can then follow the preparation of these filler suspensions.

1. Precipitation using a Precipitation Tube (Semicontinuous Precipitation)

For this, a Brönsted acid, preferably sulfuric acid, is used to adjust the filler suspension described above which is composed of the core black at an early stage to the final pH value for the precipitation of from 2.5 to 6, preferably from 3.8 to 5.5. The suspension is then run through a tubular reactor together with the rubber-latex emulsion. This initiates coagulation of the latex and formation of the rubber powder grains, and the grains formed are collected in a tank. The pH value of the precipitation includes all values and subvalues therebetween, especially including 3, 3.5, 4, 4.5, 5 and 5.5.

At the same time, an aqueous suspension with a pH of from 7 to 9.5, preferably from 7.5 to 8.5, made from the second portion of the carbon black (splitting black 1) composed of from 30 to 60% of the entirety of the carbon black is fed continuously to the rubber powder grains formed in the collector. Again in parallel with this, continuous addition of 10% sulfuric acid is used to maintain the pH of the rubber powder suspension at the desired final pH for the precipitation, i.e. from 2.5 to 6, preferably from 3.8 to 5.5, and the precipitation is completed under these conditions. The grain size of the rubber powder is controlled via the continuous feed of the splitting black 1.

Once the precipitation has ended, the third portion of the carbon black (splitting black 2), consisting of from 5 to 15% of the entirety of the carbon black, is added, in the form of a filler suspension, to the aqueous rubber powder suspension. Optionally, sulfuric acid is again used to adjust the final pH value within the above-mentioned range.

2. Premix Precipitation

First, a filler suspension is prepared by dispersing a portion of the filler present in the final product preferably from 50 to 98%, in water. The portion of the filler includes all values and subvalues therebetween, especially including 55, 60, 65, 70, 75, 80, 85, 90 and 95%. The solids content of the suspension is from 1 to 10%, preferably from 4 to 7%, depending on the nature of the filler and on its degree of disaggregation. The solids content includes all values and subvalues therebetween, especially including 2, 3, 4, 5, 6, 7, 8 and 9%. The pH of the suspension here is from 7 to 9.5, preferably from 7.5 to 9. The pH includes all values and subvalues therebetween, especially including 7.5, 8, 8.5 and 9.

The resultant filler suspension, together with the entirety of the rubber-latex emulsion, is charged to a precipitation tank and vigorously stirred. A 10% $H_2SO_4$ solution is then fed to carry out the precipitation, while the final pH of the precipitation suspension is brought within a range from 2.5 to 6, preferably from 3.8 to 5.5. Splitting black 1 (from 2 to 50% of the entirety of the carbon black), likewise suspended in water, is then added. Optionally, $H_2SO_4$ is again used to adjust the pH.

The rubber powder is preferably precipitated at a temperature of from 10 to 60° C., and more preferably at an ambient temperature of from 20 to 35° C.

Preferred rubber types are emulsion SBR, acrylonitrile rubber, aqueous-emulsion polymerized butadiene rubber and natural rubber which are used individually or in a mixture.

In the case of natural rubber, a particularly preferred form is that known as "field latex" with Mooney viscosities of from 50 to 120 Mooney units, and preferably of from 55 to 75 Mooney units.

The solids content of the rubber emulsions is preferably of from 15 to 65%, and more preferably from 20 to 30%. The solids content includes all values and subvalues therebetween, especially including 20, 25, 30, 35, 40, 45, 50, 55 and 60%.

The fillers comprise the carbon blacks known from rubber processing. These include furnace blacks, gas blacks and flame blacks with an iodine adsorption value of from 5 to 1000 m$^2$/g, a C TAB value of from 15 to 600 m$^2$/g, a DBP adsorption of from 30 to 400 ml/100 g and a 24 M4 DBP value of from 50 to 370 ml/100 g, in amounts of from 5 to 250 parts by weight, preferably from 20 to 150 parts by weight, per 100 parts by weight of rubber, and preferably per 40 to 100 parts by weight of rubber.

In a preferred embodiment, the products of the invention comprise carbon blacks of application DE 198 40 663 having improved dynamic properties compared to standard carbon blacks.

In this case the total amount of filler is from 20 to 250 parts of filler per 100 parts of rubber. The rubber powders of the invention can comprise, besides the abovementioned carbon black fillers, precipitated silicas and naturally occurring fillers, organosilanes and, if desired, known processing or vulcanization auxiliaries, such as zinc oxide, zinc stearate, stearic acid, polyalcohols, polyamines, plasticizers, aging inhibitors to protect from the action of heat, light or oxygen and ozone, reinforcing resins, flame retardants, e.g. $Al(OH)_3$ and $Mg(OH)_2$, pigments, various crosslinking chemicals and, if desired, sulfur, in the concentrations usual for vulcanization.

The rubber powders present in water and obtained by the above procedure are then substantially dewatered by mechanical means. Preferred assemblies are centrifuges or vacuum-belt filters.

Finally, heat-drying takes place, preferably in a fluidized-bed dryer, to reduce the moisture to a value of $\leq 3\%$, preferably $\leq 1\%$.

In another preferred embodiment, it has been proven to be advantageous for the finished, dried rubber powder to be powdered, i.e. dry-coated, with suitable products used in the rubber industry for a further reduction in tack. Suitable products include stearic acid, silicas and in particular zinc oxide, in amounts of from 0.1 to 3 phr, and preferably of from 0.25 to 1 phr. The application of the coating layer onto the rubber powder grains takes place in suitable powder mixers, in which the use of shear is avoided in order not to damage the grains.

The applied coating layer particularly allows storage over prolonged periods with high compaction of the product (e.g. in a silo, without blocking).

The rubber powders of the invention are used for preparing vulcanizable rubber mixtures. All of the constituents needed to prepare the mixture may be present here in the rubber powder. However, the constituents preferably comprise rubber of the grades listed above and fillers, but they may also be mixed in a conventional manner with other rubbers and with fillers if this is a requirement for the desired rubber mixture.

The fine-particle rubber powders of the invention are easy to process, give excellent dispersions in vulcanizing mixtures, and give vulcanizates with improved properties.

Having generally described this invention, a further understanding can be obtained by reference to certain specific examples which are provided herein for purposes of illustration only, and are not intended to be limiting unless otherwise specified.

EXAMPLES

Preparation Examples

I. NR/N234 47 phr Filler Level, Tube-precipitated 14.1 kg of N234 and 352 L of water were stirred to prepare a stable dispersion with a solids content of 4%. The carbon black suspension was then divided up in a ratio of 50

(core black): 40 (splitting 1): 10 (splitting 2). The two splitting blacks were passed to the respective splitting containers provided for this purpose.

The carbon black suspension with the core black was then set to pH 5 using a 10% $H_2SO_4$ solution, and the resultant carbon black suspension, together with the latex, were passed to the precipitation tube. At the same time, splitting 1 was fed from the splitting container via a pump into the collector for the produced powder rubber grains. In parallel, the pH of the powder rubber suspension, which would rise through addition of the alkaline splitting black (pH about 9), was kept constant at pH 5 using $H_2SO_4$. Once the precipitation procedure had finished, splitting 2 was fed, and here again the pH was kept at 5 by adding $H_2SO_4$. After about 2 hours of aging time, the powder rubber was mechanically dewatered and then dried down to <1% moisture content.

II. E-SBR/N234, 76 phr Filler Level, Premix Precipitation 26.6 kg of N234 and 532 L of water were stirred to prepare a 5% carbon black suspension. The suspension was then divided up in a ratio of 80 (core black): 20 (splitting black). Latex and core black were passed to the precipitation vessel and a 10% $H_2SO_4$ solution was added to set the pH to 4. Once the precipitation had ended, splitting black was fed and $H_2SO_4$ was again used to adjust the pH of the powder rubber suspension to 4. Most of the water was then moved mechanically, if desired after an aging period, and the moist product was then dried to residual moisture $\leq 1\%$.

For further reduction in the tack of the dry product, it was then coated in a powder mixer with 0.5 phr of ZnO.

Examples

A) Raw materials used
1) Raw materials for rubber powder preparation

| Corax N 234 | Furnace black from Degussa Hüls with an $I_2$ adsorption of 120 mg/g |
| --- | --- |
| NR field latex | Latex with a Mooney viscosity of ~55–60, stabilized with ZnO/TMTD/$NH_3$, from Inter Rubber Latex Co. The strength of the latex in water is about 30%. |
| E-SBR 1500 | Latex with a Mooney viscosity of ~42, from BSL. The strength of the latex in water is about 20%. |

2) Constituents of the vulcanizing mixtures

| SMR 10 | Standard Malaysian Rubber: natural rubber |
| --- | --- |
| 6PPD | N-(1,3-dimethylbutyl)-N'-phenyl-p-phenylenediamine |
| TMQ | 2,2,4-trimethyl-1,2-dihydroquinoline |
| Protektor G35 | Mixture of refined hydrocarbon waxes |
| Stearic acid | Mixture of $C_{12}$–$C_{18}$ monocarboxylic acids |
| ZnO RS | Rotsiegel zinc oxide |
| TBBS | N-tert-butyl-2-benzothiazylsulfenamide |
| CTP | N-cyclohexylthiophthalimide |

B) Vulcanizate test methods

| Tensile bar test | DIN 53 504 |
| --- | --- |
| Shore hardness | DIN 53 505 |
| Tear propagation resistance | DIN 53 507 |
| Abrasion | DIN 53 516 |
| Dispersion (roughness) | DIN 47 88 |

1) Comparison of vulcanizate property profile from the product of the invention (Preparation Example 1) NR/carbon black with a standard mixture

|  | 1 | 2 |
| --- | --- | --- |
| SMR 10 (ML 1 + 4 70–80) | 100 | — |
| PR I* | — | 150 |
| N234 | 50 | — |
| 6PPD | 1 | 1 |
| TMQ | 1.5 | 1.5 |
| ZnO RS | 4 | 4 |
| Stearic acid | 2 | 2 |
| Wax | 1 | 1 |
| TBBS | 1.2 | 1.2 |
| CTP | 0.15 | 0.15 |
| Sulfur | 1.4 | 1.4 |

*100 parts of NR latex, 47 parts of N234 fluffy

2) Mixing Specification $1^{st}$ stage

Internal mixer: GK 1, 5 E; Volume: 1.6 L; Friction 1:1; Ram 5.5 bar

| Mixture |  | 1 | 2 |
| --- | --- | --- | --- |
| Filler level |  | 0.55 | 0.7 |
| RPM | [1/min] | 70 | 70 |
| Chamber temperature | [° C.] | 80 | 80 |

| 0-2' polymer, carbon black, ZnO RS, stearic acid, wax | 0-2' PK, ZnO RS, stearic acid, wax |
| --- | --- |
| 2-4' 6PPD, TMQ, | 2-4' 6PPD, TMQ, |
| 4' Discharge | 4' Discharge |
| Discharge temperature ~ 150° C. | Discharge temperature ~ 150° C. |

$2^{nd}$ stage

| Internal mixer | GK 1, 5 E; Volume: 1.6 L; Friction 1:1; Ram 5.5 bar; RPM 40; Filler level 0.55; running temperature 50° C. |
| --- | --- |

| 0–2' | Batch stage 1, accelerator, sulfur | 0–2' | Batch stage 1, accelerator, sulfur |
| --- | --- | --- | --- |
| 2' temperature | Discharge ~100° C. | 2' temperature | Discharge ~100° C. | c) Vulcanizate Properties

| Mixture number |  | 1 | 2 |
| --- | --- | --- | --- |
| $D_{max}$-$D_{min}$ | [dNm] | 13.54 | 14.77 |
| Tensile strength | [MPa] | 17.3 | 17.1 |
| 300% modulus | [MPa] | 8 | 8.8 |
| Shore A hardness | [SH] | 70 | 73 |
| Tear propagation resistance | [N/mm] | 49 | 51 |
| Dispersion [roughness] | [%] | 8.6 | 1.1 |

The product of the invention exhibits advantages in modulus, and particularly in DIN abrasion and in dispersion values.

The priority document of the present application, German patent application 100 08 877.5, filed Feb. 25, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A process for preparing a fine-particle, pulverulent, filled rubber, comprising:
   dividing an entirety of a filler into core black, splitting black 1 and splitting black 2, wherein an amount of a water-insoluble constituent of said filler is from 1 to 10%;
   dispersing said core black in water, thereby providing a suspension of said core black;
   dispersing said splitting black 1 in water, thereby providing a suspension of said splitting black 1;
   dispersing said splitting black 2 in water, thereby providing a suspension of said splitting black 2;
   adjusting the pH of said suspension of said core black to a value of from 2.5 to 6 by using a Brønsted acid;
   running said suspension of said core black together wit a rubber latex emulsion through a tubular reactor, thereby initiating a coagulation of said rubber latex emulsion and formation of rubber powder gains;
   forming said rubber powder gains;
   collecting said rubber powder gains in a tank and simultaneously continuously feeding said suspension of said splitting black 1 having a pH of from 7 to 9.5 to the rubber powder gains collected in said tank, thereby controlling the grain size of the rubber powder and obtaining a rubber powder suspension;
   continuously maintaining the pH of the rubber powder suspension at 2.5 to 6;
   precipitating said fine-particle, pulverulent, filled rubber in the absence of a water-soluble salt of a metal of Groups IIa, IIb, IIIa or VIII of the Periodic Table of the Elements, and in the absence of an alkali metal silicate;
   adding said suspension of splitting black 2 to said fine-particle, pulverulent, filled rubber after the precipitation, wherein optionally an acid is used to maintain the pH of said rubber powder suspension at a value of from 2.5 to 6.

2. A process for preparing a fine-particle, pulverulent, filled rubber, comprising:
   dividing an entirety of a filler into 50 to 98% by weight of core black and 2 to 50% by weight of splitting black 1, wherein an amount of a water-insoluble constituent of said filler is from 1 to 10%;
   dispersing said core black in water, thereby providing a suspension of said core black having a pH of 7 to 9.5;
   dispersing said splitting black 1 in water, thereby providing a suspension of said splitting black 1;
   forming an initial charge of said suspension of said core black with a rubber-latex emulsion in a precipitation tank under vigorous stirring;
   adjusting the pH of said suspension of said core black to a value of from 2.5 to 6;
   adding said suspension of said splitting black 1 to obtain a mixed suspension; and
   precipitating said fine-particle, pulverulent, filled rubber in the absence of a water-soluble salt of a metal of Groups IIa, IIb, IIIa or VIII of the Periodic Table of the Elements, and in the absence of an alkali metal silicate;
   optionally adjusting the pH of said mixed suspension to 2.5 to 6.

3. The process according to claim 1, wherein said entirety of said filler comprises of from 30 to 60% by weight of core black, of from 30 to 60% by weight of splitting black 1 and of from 5 to 15% by weight of splitting black 2.

4. The process according to claim 1, wherein said Brønsted acid is sulfuric acid.

5. The process according to claim 2, wherein said acid sulfuric acid.

6. The process according to claim 1, wherein
   said precipitating occurs at temperatures of from 10 to 60° C.

7. The process according to claim 1, wherein said rubber is selected from the group consisting of emulsion styrene-butadiene rubber, acrylonitrile rubber, aqueous-emulsion-polymerized butadiene rubber, natural rubber and a mixture thereof.

8. The process according to claim 7, wherein said natural rubber comprises field latex with a Mooney viscosity of from 50 to 120 Mooney units.

9. The process according to claim 1, wherein the solids content of said rubber-latex emulsion is from 15 to 65%.

10. The process according to claim 1 or 2, wherein the filler comprises a carbon black.

11. The process according to claim 10, wherein the carbon black is selected from the group consisting of furnace black, gas black, flame black and mixtures thereof:
    wherein said carbon black has an iodine adsorption value of from 5 to 1000 $m^2/g$, a CTAB number of from 15 to 600 $m^2/g$, a DBP adsorption of from 30 to 400 ml/100 g and a 24 M4 DBP number of from 50 to 370 ml/100 g; and
    wherein the amount of said carbon black is from 5 to 250 parts by weight based on 100 parts by weight of rubber.

12. The process according to claim 1, wherein said fine-particle, pulverulent, filled rubber comprises processing or vulcanizing auxiliaries selected from the group consisting of zinc oxide, zinc stearate, stearic acid, a polyalcohol, a polyamine, a plasticizer, an aging inhibitor, a reinforcing resin, a flame retardant, a pigment, a crosslinking agent, sulfur and mixture thereof.

13. The process according to claim 1 or 2, further comprising dewatering said rubber powder by a centrifuge or a vacuum-belt filter.

14. The process according to claim 13, further comprising drying of said rubber powder using heat to a residual moisture of ≦3%.

15. The process according to claim 14, further comprising dry-coating of said rubber powder.

16. The process according to claim 15, wherein from 0.1 to 3 phr of a coating material is applied to said rubber powder in a powder mixer.

17. The process according to claim 15, wherein said coating material is selected from the group consisting of stearic acid, silica, zinc oxide or a mixture thereof.

18. A process for preparing a fine-particle, pulverulent, filled rubber, comprising:
    precipitating said fine-particle, pulverulent, filled rubber from an aqueous mixture of a filler suspension and a rubber-latex emulsion in the absence of a water-soluble salt of a metal of Groups IIa, IIb, IIIa or VIII of the Periodic Table of the Elements, and in the absence of an alkali metal silicate;
    wherein said rubber is a) natural rubber or b) a mixture of natural rubber and a compound selected from the group consisting of emulsion styrene-butadiene rubber, acrylonitrile rubber, aqueous-emulsion-polymerized butadiene rubber; and
    wherein said natural rubber comprises field latex with a Mooney viscosity of from 50 to 120 Mooney units.

19. The process according to claim 18, wherein said precipitating of said line-particle, pulverulent, filled rubber comprises the following steps:

dividing an entirety of a filler into core black, splitting black 1 and splitting black 2, wherein an amount of a water-insoluble constituent of said filler is from 1 to 10% dispersing said core black in water, thereby providing a suspension of said core black; dispersing said splitting black 1 in water, thereby providing a suspension of said splitting black 1;

dispersing said splitting black 2 in water, thereby providing a suspension of said splitting black 2;

adjusting the pH of said suspension of said core black to a value of from 2.5 to 6 by using a Brønsted acid;

running said suspension of said core black together with said rubber latex emulsion through a tubular reactor, thereby initiating a coagulation of said rubber latex emulsion and formation of rubber powder grains;

forming said rubber powder grains;

collecting said rubber powder grains in a tank and simultaneously continuously feeding said suspension of said splitting black 1 having a pH of from 7 to 9.5 to the rubber powder grains collected in said tank, thereby controlling the grain size of the rubber powder and obtaining a rubber powder suspension;

continuously maintaining the pH of the rubber powder suspension at 2.5 to 6;

adding said suspension of splitting black 2 to the aqueous rubber powder suspension after the precipitation, wherein optionally an acid is used to maintain the pH of said rubber powder suspension at a value of from 2.5 to 6.

20. The process according to claim 19, wherein said entirety of said filler comprises of from 30 to 60% by weight of core black, of from 30 to 60% by weight of splitting black 1 and of from 5 to 15% by weight of splitting black 2.

21. The process according to claim 19, wherein said Brønsted acid is sulfuric acid.

22. The process according to claim 19, wherein said acid is sulfuric acid.

23. The process according to claim 19, wherein the filler comprises a carbon black.

24. The process according to claim 23, wherein the carbon black is selected from the group consisting of furnace black, gas black, flame black and mixtures thereof;

wherein said carbon black has an iodine adsorption value of from 5 to 1000 $m^2/g$, a CTAB number of from 15 to 600 $m^2/g$, a DBP adsorption of from 30 to 400 ml/100 g and a 24 M4 DBP number of from 50 to 370 ml/100 g; and wherein the amount of said carbon black is from 5 to 250 parts by weight based on 100 parts by weight of rubber.

25. The process according to claim 19, further comprising dewatering said fine-particle, pulverulent, filled rubber by a centrifuge or a vacuum-belt filter.

26. The process according to claim 25, further comprising drying of said rubber powder using heat to a residual moisture of $\leq 3\%$.

27. The process according to claim 26, further comprising dry-coating of said rubber powder.

28. The process according to claim 27, wherein from 0.1 to 3 phr of a coating material is applied to said rubber powder in a powder mixer.

29. The process according to claim 27, wherein said coating material is selected from the group consisting of stearic acid, silica, zinc oxide or a mixture thereof.

30. The process according to claim 18, wherein said precipitating occurs at temperatures of from 10 to 60° C.

31. The process according to claim 18, wherein the solids content of said rubber-latex emulsion is from 15 to 65%.

32. The process according to claim 18, wherein said fine-particle, pulverulent, filled rubber comprises processing or vulcanizing auxiliaries selected from the group consisting of zinc oxide, zinc stearate, stearic acid, a polyalcohol, a polyamine, a plasticizer, an aging inhibitor, a reinforcing resin, a flame retardant, a pigment, a crosslinking agent, sulfur and mixture thereof.

* * * * *